United States Patent
Suzuki et al.

(10) Patent No.: US 6,735,045 B2
(45) Date of Patent: May 11, 2004

(54) HARD DISK DEVICE HAVING A SHROUD MEMBER FIXED ON A BASE AS A SEPARATE MEMBER

(75) Inventors: Yasuo Suzuki, Kawasaki (JP); Kiyoko Morii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 79 days.

(21) Appl. No.: 09/964,098

(22) Filed: Sep. 26, 2001

(65) Prior Publication Data
US 2002/0149877 A1 Oct. 17, 2002

(30) Foreign Application Priority Data
Apr. 13, 2001 (JP) ........................ 2001-116023

(51) Int. Cl.$^7$ ............................................. G11B 17/02
(52) U.S. Cl. .................................................. 360/97.02
(58) Field of Search ........................... 360/97.02, 97.03, 360/97.01

(56) References Cited

U.S. PATENT DOCUMENTS

| | | | |
|---|---|---|---|
| 4,979,062 A | | 12/1990 | Stefansky et al. |
| 5,631,787 A | | 5/1997 | Huang et al. |
| 5,907,453 A | | 5/1999 | Wood et al. |
| 5,956,203 A | | 9/1999 | Schirle et al. |
| 6,125,003 A | | 9/2000 | Tsuda et al. |
| 6,271,987 B1 | * | 8/2001 | Allsup et al. ............ 360/97.03 |
| 6,496,327 B2 | * | 12/2002 | Xia et al. ................ 360/97.03 |

FOREIGN PATENT DOCUMENTS

WO    WO 00/49616    8/2000

\* cited by examiner

Primary Examiner—Robert S. Tupper
(74) Attorney, Agent, or Firm—Greer, Burns & Crain, Ltd.

(57) ABSTRACT

A hard disk device is provided. The hard disk device comprises, in a housing having a base, a hard disk rotating at a high speed, a carriage having a head slider on one end thereof, a magnetic circuit causing the carriage to revolve back and forth alternately around an axis, and a shroud member fixed on the base. The shroud member is a separate member from the base.

2 Claims, 12 Drawing Sheets

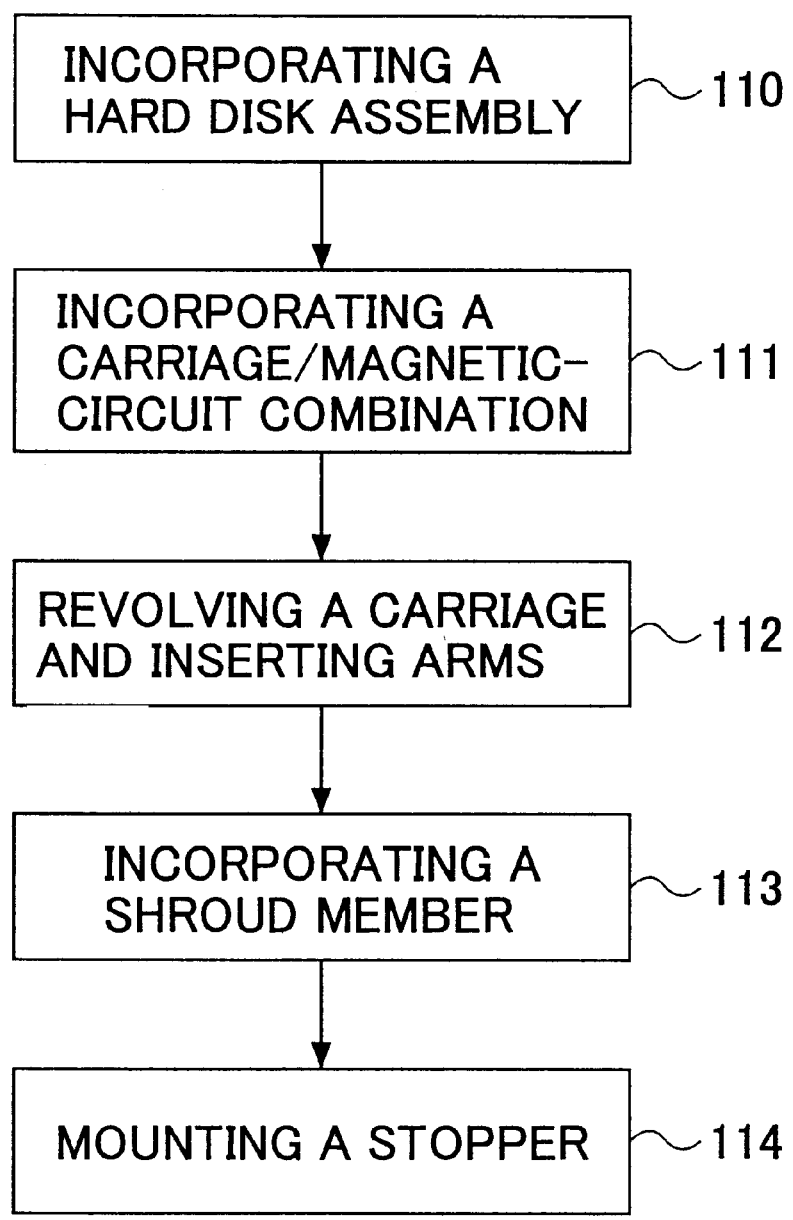

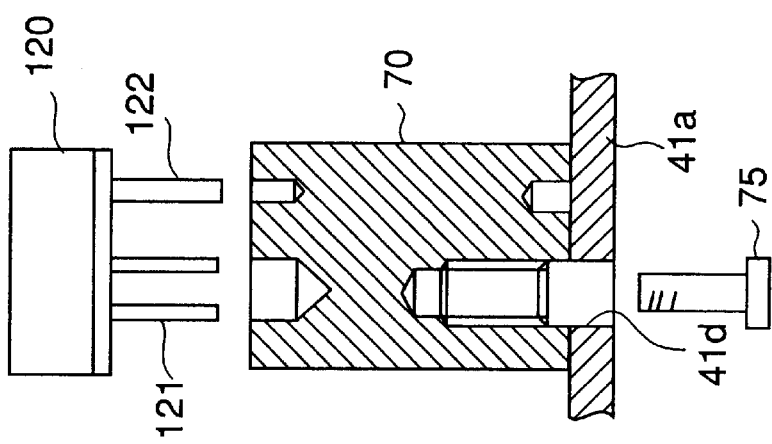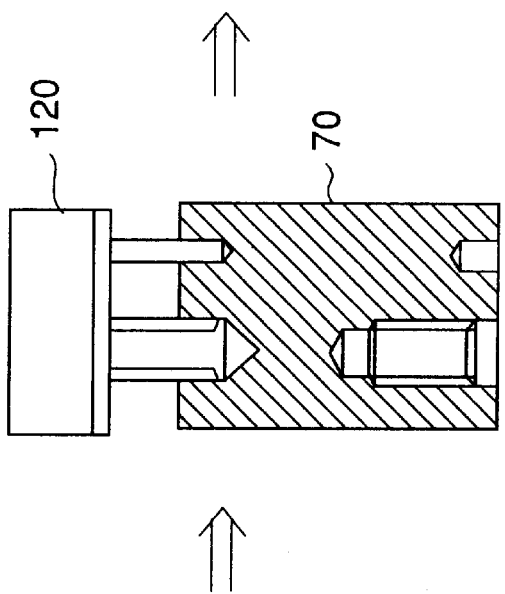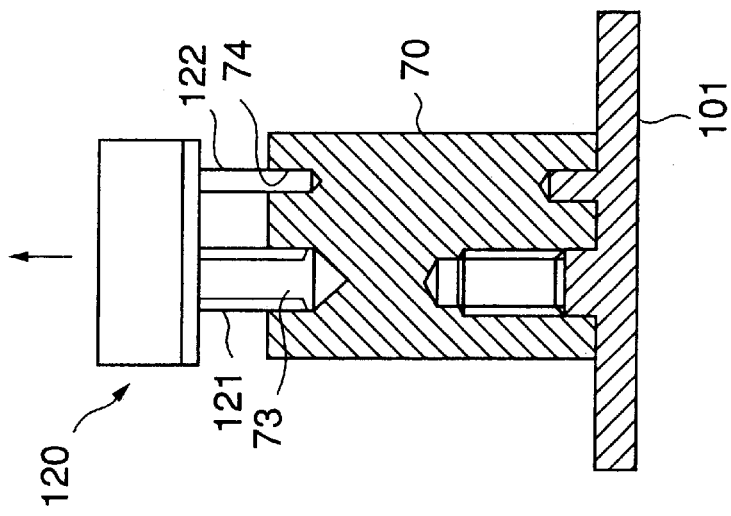

HARD DISK DEVICE HAVING A SHROUD MEMBER FIXED ON A BASE AS A SEPARATE MEMBER

BACKGROUND OF THE INVENTION

1. Field of the Invention

The present invention generally relates to a hard disk device and, more particularly, to a hard disk device having a hard disk rotating at a high speed, a carriage having a head slider at the tip thereof, and a magnetic circuit causing the carriage to revolve back and forth alternately, in a housing composed of a base and a cover.

Hard disk devices are being made to have higher recording densities. As the recording density becomes higher, track pitch becomes narrower. Accordingly, the tracking of a head slider needs to be controlled with high precision, and non-repeatable runout (NRRO) has to be restricted to a small extent. The non-repeatable runout is an off-track amount of the head slider from a track on a hard disk, which is not synchronous with rotation of a spindle motor. The non-repeatable runout is expressed in $\mu$m.

One of the causes that produce the non-repeatable runout is that airflow caused by the hard disk rotating at a high speed contacts and affects the head slider and an arm. Thereupon, in order to restrict the non-repeatable runout to a small extent, the airflow caused by the hard disk rotating at a high speed needs to be made as stable as possible.

Besides, a hard disk device is preferred to be easy to assemble.

2. Description of the Related Art

FIG. 1 is an illustration of a conventional hard disk device 10, with a cover thereof being removed. The hard disk device 10 comprises a hard disk 13 rotating at a high speed in a clockwise direction indicated by an arrow C, a carriage 15 having a head slider 14 at an end thereof, and a magnetic circuit 16 causing the carriage 15 to revolve back and forth alternately, in a housing 12 composed of a base 11 and the cover (not shown in the figure).

Shrouds 20 and 21 are formed unitarily with the base 11, and surround the hard disk 13. These shrouds 20 and 21 are provided so as to stabilize an airflow 25 on the surface of the hard disk 13 which is caused by the hard disk 13 rotating at a high speed; this restricts the non-repeatable runout to a small amount.

The maximum point to which the carriage 15 is revolved counterclockwise is a position at which a part of the carriage 15 at an opposite end to the head slider 14 contacts the shroud 21, as indicated by a dashed chain line in FIG. 1. In this position, the head slider 14 reaches outside the hard disk 13, whereas a part of the carriage 15 overlaps the hard disk 13.

Therefore, in assembling the hard disk device 10, the hard disk 13 and the carriage 15 are first assembled on an assembly apparatus into an assembly combined in a positional relationship indicated by the dashed chain line in FIG. 1. Then, while keeping this positional relationship, the hard disk 13 and the carriage 15 along with the magnetic circuit 16 are carried together to the base 11 so as to be set thereon.

Since the hard disk 13, the carriage 15 and the magnetic circuit 16 are carried together while the positional relationship therebetween being kept, the process of assembling the hard disk device 10 requires a complicated and costly facility, which to that extent raises the manufacturing cost of the hard disk device 10.

SUMMARY OF THE INVENTION

It is a general object of the present invention to provide an improved and useful hard disk device in which the above-mentioned problems are eliminated.

A more specific object of the present invention is to provide a hard disk device having a structure which restricts a non-repeatable runout to a small amount, and can enable the step of incorporating a hard disk into a base and the step of incorporating a carriage into the base to be performed separately.

In order to achieve the above-mentioned objects, there is provided according to one aspect of the present invention a hard disk device comprising:

a housing having a base;

a hard disk provided in the housing, the hard disk rotating at a high speed in at least one rotational direction;

a carriage provided in the housing, the carriage having a head slider on one end thereof;

a magnetic circuit provided in the housing, the magnetic circuit causing the carriage to revolve back and forth alternately around an axis; and a shroud member fixed on the base, the shroud member being a separate member from the base.

According to the present invention, the shroud member can be mounted afterward. In other words, the hard disk, the carriage, and the magnetic circuit can be incorporated into the base before the shroud member is mounted on the base. Thereby, the hard disk and the carriage can be incorporated into the base separately and independently, not by being combined and carried together.

Additionally, in the hard disk device according to the present invention, the shroud member may be positioned in a space between the carriage and the magnetic circuit, the space existing at an upstream position from the axis in the rotational direction of the hard disk.

According to the present invention, the shroud member is positioned in the above-mentioned space so as to stabilize an airflow affecting the head slider, restricting a non-repeatable runout to a small extent effectively.

Additionally, in the hard disk device according to the present invention, the magnetic circuit may have a chamfer at a position opposite an outer periphery of the hard disk, the position being located at an upstream position from the axis in the rotational direction of the hard disk;

the shroud member may have a wedge-like portion having a shape corresponding to a wedge-like space formed between the chamfer and the outer periphery; and the shroud member may be so positioned that the wedge-like portion enters the wedge-like space.

According to the present invention, the wedge-like portion lengthens a surface of the shroud member opposing the outer periphery of the hard disk. Thus, the shroud member effectively restricts a non-repeatable runout to a small extent.

Additionally, in the hard disk device according to the present invention, the shroud member may have a female screw portion at an undersurface thereof so that the shroud member is fixed on the base by a screw passed from an undersurface of the base through the base into the female screw portion.

According to the present invention, the shroud member can be fixed firmly on the base by the screw.

Additionally, in the hard disk device according to the present invention, the shroud member may have a female screw portion and a positioning hole at an undersurface thereof, the female screw portion having an opening at a lower end thereof, so that the shroud member is fixed on the base in a predetermined direction by being conveyed on the base while being supported on a palette at a position in the same direction by having the opening and the positioning hole passed through by projections on the palette, respectively.

According to the present invention, an apparatus incorporating the shroud member from the palette to the base does not need to change the direction of the shroud member. Additionally, the shroud member can be fixed firmly on the base with an excellent precision.

Other objects, features and advantages of the present invention will become more apparent from the following detailed description when read in conjunction with the accompanying drawings.

BRIEF DESCRIPTION OF THE DRAWINGS

FIG. 5 is a flowchart of steps of assembling the hard disk device shown in FIG. 2;

FIG. 10A to FIG. 10C are cross-sectional views illustrating a step 113 shown in FIG. 5;

DETAILED DESCRIPTION OF THE PREFERRED EMBODIMENTS

A description will now be given, with reference to the drawings, of embodiments according to the present invention.

Figure 1:
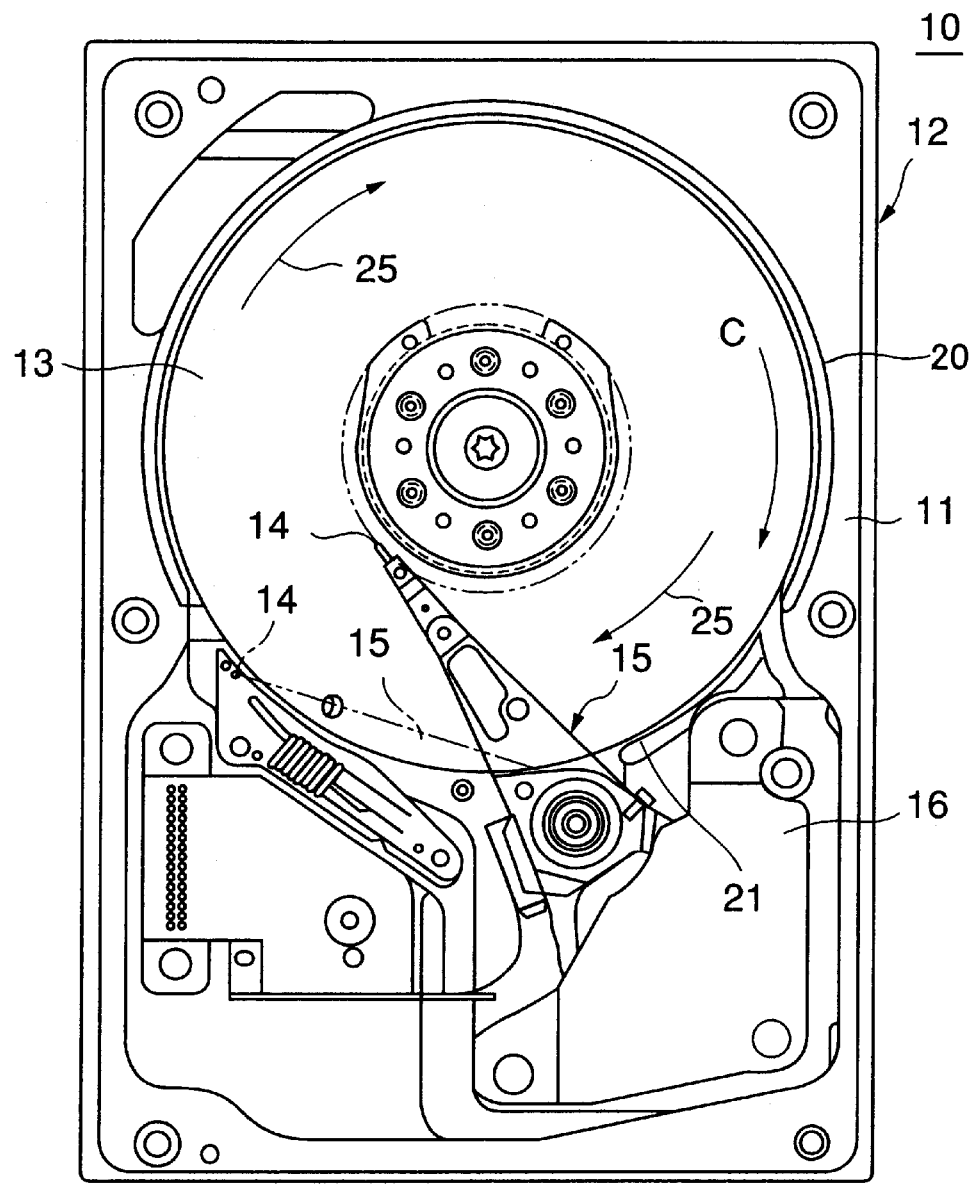
FIG. 1 shows an example of a conventional hard disk device.
Figure 2:
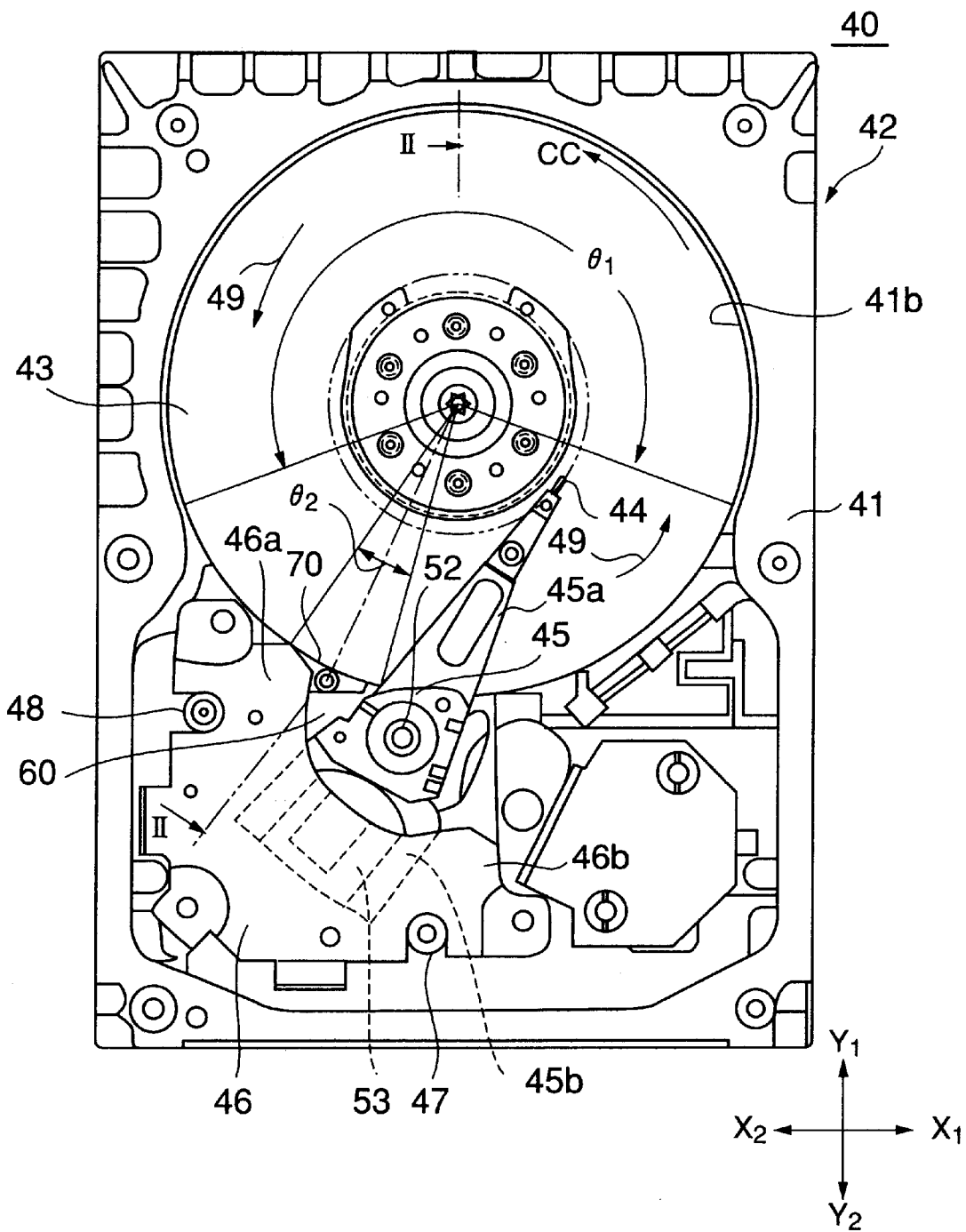
FIG. 2 is a plan view of a hard disk device according to an embodiment of the present invention, with a cover thereof being removed.

FIG. 2 is a plan view of a hard disk device 40 according to an embodiment of the present invention, with a cover thereof being removed. The hard disk device 40 comprises a hard disk 43 having a diameter of 3.5 inches rotating at a high speed in a counterclockwise direction indicated by an arrow CC, a carriage 45 having a head slider 44 on one end thereof, and a magnetic circuit 46 causing the carriage 45 to revolve back and forth alternately by using an electromagnetic force, each provided in a housing 42 composed of a box-shaped base 41 and the cover (not shown in the figure) covering the surface of the hard disk device 40. An airflow 49 caused by the hard disk 43 rotating at a high speed upon writing or reading data levitates the head slider 44 slightly from the face of the hard disk 43.

Figure 3:
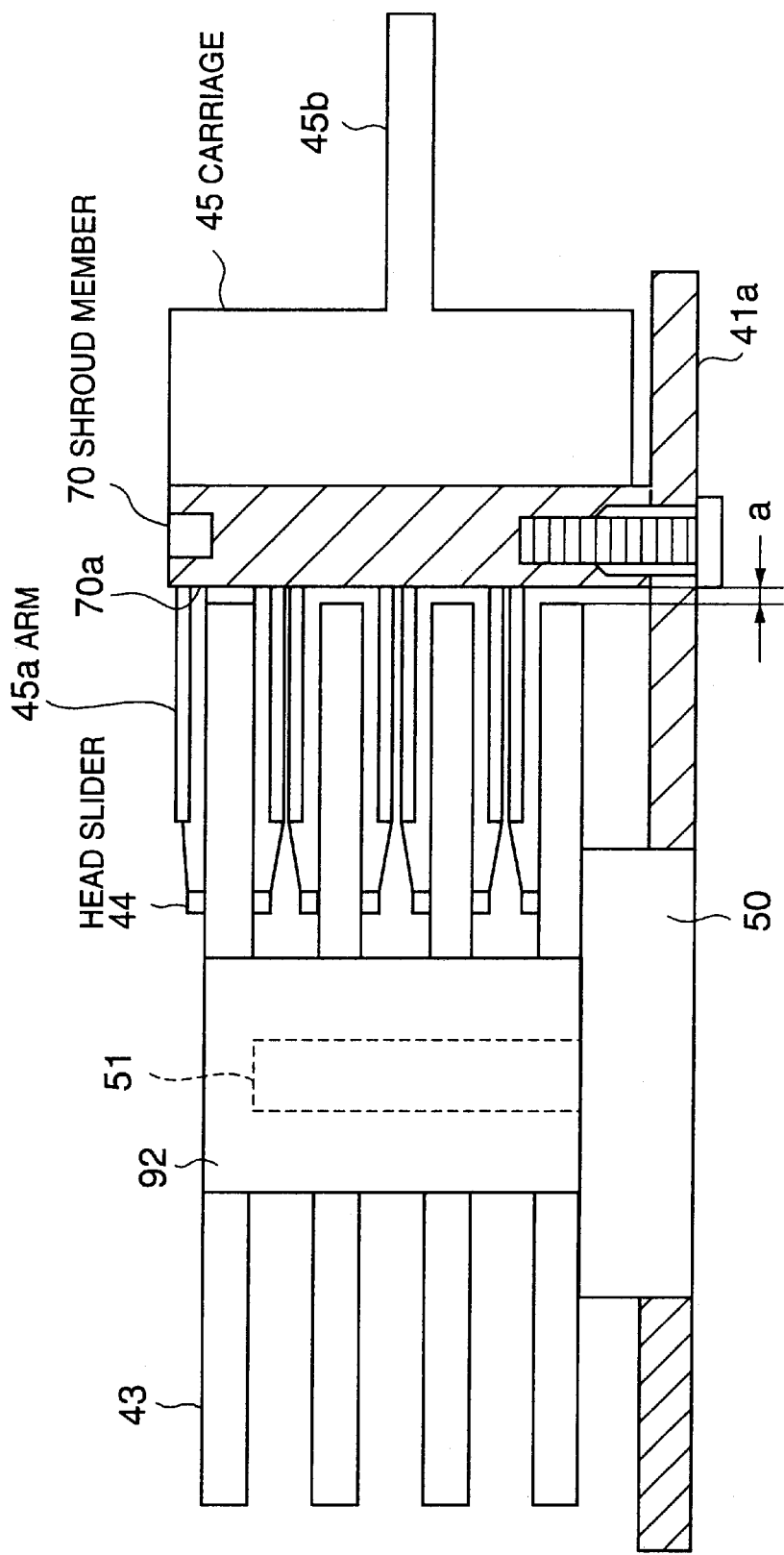
FIG. 3 is a magnified cross-sectional view taken along a line II—II in FIG. 2.

The base 41 has a shroud 41b being formed unitarily with a base board 41a (shown in FIG. 3). The shroud 41b is provided in a range corresponding to an angle θ1 (approximately 220 degrees) around the hard disk 43 on a side of Y1.

FIG. 3 is a magnified cross-sectional view taken along a line II—II in FIG. 2. As shown in FIG. 3, the hard disk 43 is fixed to a spindle 51 of a spindle motor 50 fixed to the base board 41a of the base 41.

As shown in FIG. 2, the carriage 45 is rotatably set to an axle 52 fixed to the base board 41a of the base 41. As also shown in FIG. 3, the carriage 45 has a plurality of arms 45a at the one end thereof each two corresponding to the upper and under surfaces of the hard disk 43, and has a forked arm 45b at the other end. The head slider 44 is mounted on the tip of each of the arms 45a. A flat coil 53 is fixed on the forked arm 45b, the coil 53 being shaped trapezoid in the plan view. The magnetic circuit 46 comprises a pair of flat permanent magnets opposing each other with a flat space therebetween. The coil 53 is positioned within the flat space of the magnetic circuit 46. The magnetic circuit 46 has stoppers 47 and 48 restricting a rotatable range of the carriage 45 by stopping the forked arm 45b. As shown in FIG. 2, the magnetic circuit 46 is substantially L-shaped, and has an arm portion 46a extending in a direction Y1–Y2, and an arm portion 46b extending in a direction X1–X2. The magnetic circuit 46 is so positioned as to surround the axle 52, and is fixed to the base board 41a of the base 41.

A space 60 exists between the axle 52 and the arm portion 46a, i.e., at an upstream position near the axle 52 in the rotational direction of the hard disk 43.

As specifically shown in FIG. 9 (used in a description hereinafter), the arm portion 46a has a chamfer 46a1 at a corner thereof near the axle 52. A wedge-like space 60a is formed between the chamfer 46a1 and an outer periphery of the hard disk 43.

Figure 4A:
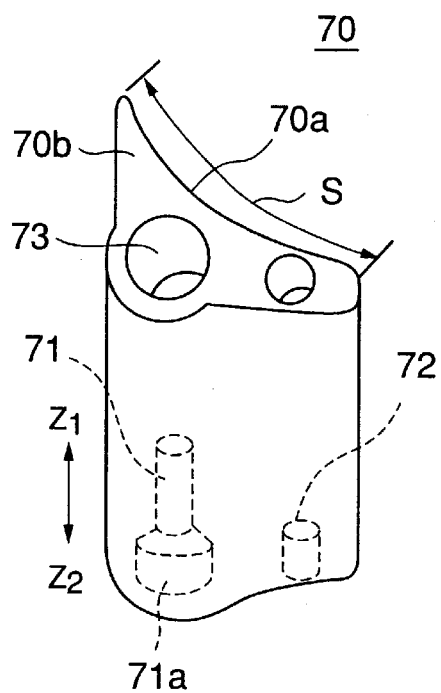
FIG. 4A is a perspective view of a shroud member shown in FIG. 2.

A shroud member 70 is a separate member from the base 41, as shown in FIG. 4A. The shroud member 70 has a shape of a substantially trigonal prism, and has a shroud surface 70a shaped as a circular arc corresponding to the outer periphery of the hard disk 43. The shroud member 70 has a size corresponding to the space 60. The shroud member 70 also has a wedge-like portion 70b corresponding to the wedge-like space 60a on one end thereof. Thus, a width S of the shroud surface 70a is as long as approximately 10 mm.

At this point, as described in detail hereinafter, due to the shroud member 70 being a separate member from the base 41, it becomes possible to incorporate the hard disk 43, the carriage 45, and the magnetic circuit 46 into the base 41, and thereafter, mount the shroud member 70 on the base 41. Arranging an assembling order as this, the hard disk 43, the carriage 45, and the magnetic circuit 46 can be incorporated into the base 41 automatically by using an assembling robot having a simple structure.

Figure 4B:
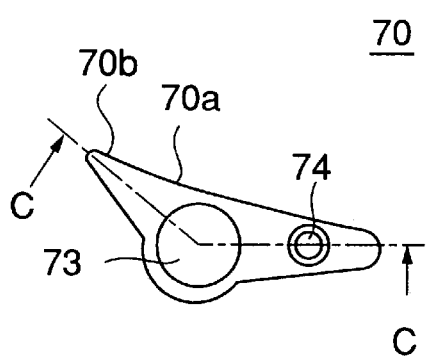
FIG. 4B is a plan view of the shroud member shown in FIG. 2.

The shroud member 70 has a female screw portion 71 and a positioning hole 72 near the bottom surface thereof, as shown in FIG. 4A, and has a chuck hole 73 provided for use by a chuck, and a positioning hole 74 near the upper surface thereof, as shown in FIG. 4B. In a direction Z1–Z2, the female screw portion 71 and the chuck hole 73 are located at the same position, and the positioning hole 72 and the positioning hole 74 are located at the same position. The female screw portion 71 has a positioning opening 71a at a lower end thereof.

Figure 4C:
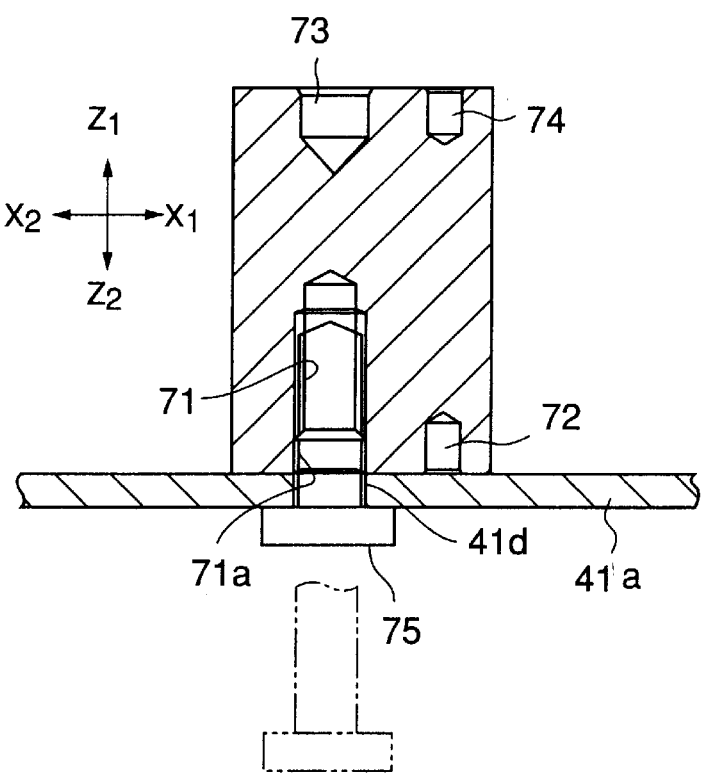
FIG. 4C is a cross-sectional view of the shroud member shown in FIG. 2.

This shroud member 70 is positioned within the space 60, and is fixed on the base board 41a of the base 41 by a screw 75 passed from the undersurface of the base board 41a through a hole 41d of the base board 41a into the female screw portion 71, as shown in FIG. 4C. As shown in FIG. 3, the shroud surface 70a of the shroud member 70 opposes the outer periphery of the hard disk 43, and a width "a" of a gap therebetween is 0.5 mm.

The shroud surface 70a of the shroud member 70 extends in a range corresponding to an angle θ2 (shown in FIG. 2) from a position near the axle 52 toward the upstream direction of the rotational direction of the hard disk 43. The wedge-like portion 70b is contained in the wedge-like space 60a; thus, the angle θ2 is as large as approximately 20 degrees.

A non-repeatable runout was measured in the hard disk device 40 according to the present invention. This non-repeatable runout is a maximum value of values measured as follows: the hard disk device 40 is driven, with the carriage 45 being fixed at a predetermined position; an off-track amount of the head slider 44 from a predetermined track on the hard disk 43 is measured repeatedly in a unit of time corresponding to one revolution of the hard disk 43; these repeatedly measured off-track amounts are represented by multiple graph-lines in a graph diagram having the axis of abscissas of the unit of time and the axis of ordinates of the off-track amount; an envelope of these multiple graph-lines is obtained; and the above-mentioned values are obtained by measuring peak-to-peak amounts of this envelope. It is noted that the time indicated by the axis of abscissas is based on a point (zero) of time at which an index signal of the hard disk 43 is read. Each of the above-mentioned graph-lines is drawn for each one revolution of the hard disk 43.

Before the shroud member 70 was mounted, the non-repeatable runout was 0.108 μm. After the shroud member 70 was mounted, the non-repeatable runout was reduced to 0.092 μm. By mounting the shroud member 70, the non-repeatable runout was improved by approximately 15%, compared to a structure without the shroud member 70. The angle θ2 being as large as approximately 20 degrees contributes to this great improvement. It is noted that a track pitch on the hard disk 43 is 0.643 μm.

Besides, in the hard disk device 40, in the course of the revolution of the hard disk 43 stopping, the carriage 45 is revolved counterclockwise so that the head slider 44 is withdrawn within the central part of the hard disk 43.

Next, a description will be given, with reference to FIG. 5 to FIG. 12, of a method of assembling the hard disk device 40 shown in FIG. 2.

First, components shown in FIG. 6A to FIG. 6D are prepared beforehand.

Figure 6A:
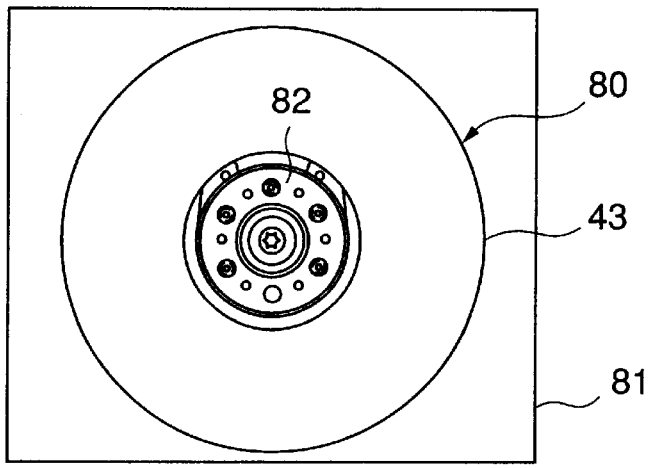
FIG. 6A is a plan view of a hard disk assembly being supported on a palette.

FIG. 6A shows a hard disk assembly 80 supported on a palette 81. The hard disk assembly 80 comprises a plurality (four) of the hard disks 43 with center holes thereof being passed through by a cylinder unit 82, and spacers between each two of the hard disks 43.

Figure 6B:
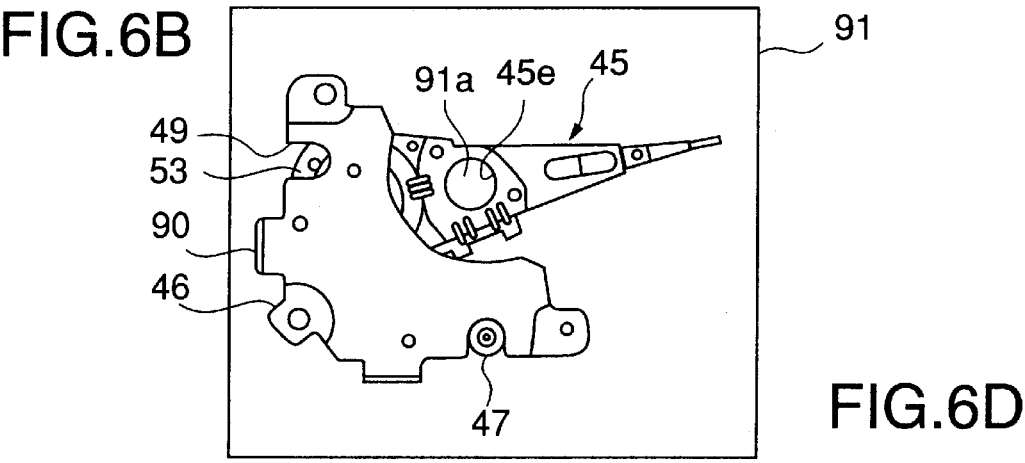
FIG. 6B is a plan view of a carriage/magnetic-circuit combination being supported on a palette.

FIG. 6B shows a carriage/magnetic-circuit combination 90 supported on a palette 91. The carriage 45 has a center hole 45e passed through by a projection 91a on the palette 91. The carriage/magnetic-circuit combination 90 comprises the carriage 45 and the magnetic circuit 46 combined together with the carriage 45 being revolved clockwise to the maximum extent. The magnetic circuit 46 does not comprise the stopper 48 yet. Thus, the forked arm 45b is revolved beyond a position at which the stopper 48 is to be mounted, and a part of the coil 53 is exposed from a cut portion 49 at which the stopper 48 is to be mounted.

Figures 6C, 6D:
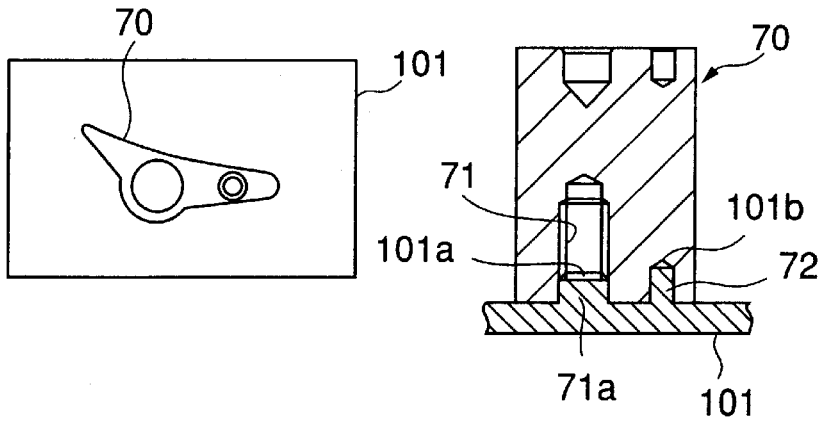
FIG. 6C is a plan view of the shroud member shown in FIG. 4B being supported on a palette.
FIG. 6D is a cross-sectional view of the shroud member shown in FIG. 4C being supported on the palette.

FIG. 6C and FIG. 6D show the shroud member 70 supported on a palette 101. The shroud member 70 has the positioning opening 71a and the positioning hole 72 passed through by projections 101a and 101b on the palette 101, respectively, so that the shroud member 70 is positioned on the palette 101 in the same direction that the shroud member 70 is to be mounted on the base 41.

The hard disk device 40 shown in FIG. 2 is assembled by automatically incorporating the hard disk assembly 80, the carriage/magnetic-circuit combination 90, the shroud member 70 and other components into the base 41 being conveyed, by using an assembling robot in a clean room.

(1) Step 110 of Incorporating the Hard Disk Assembly 80

Figure 7:
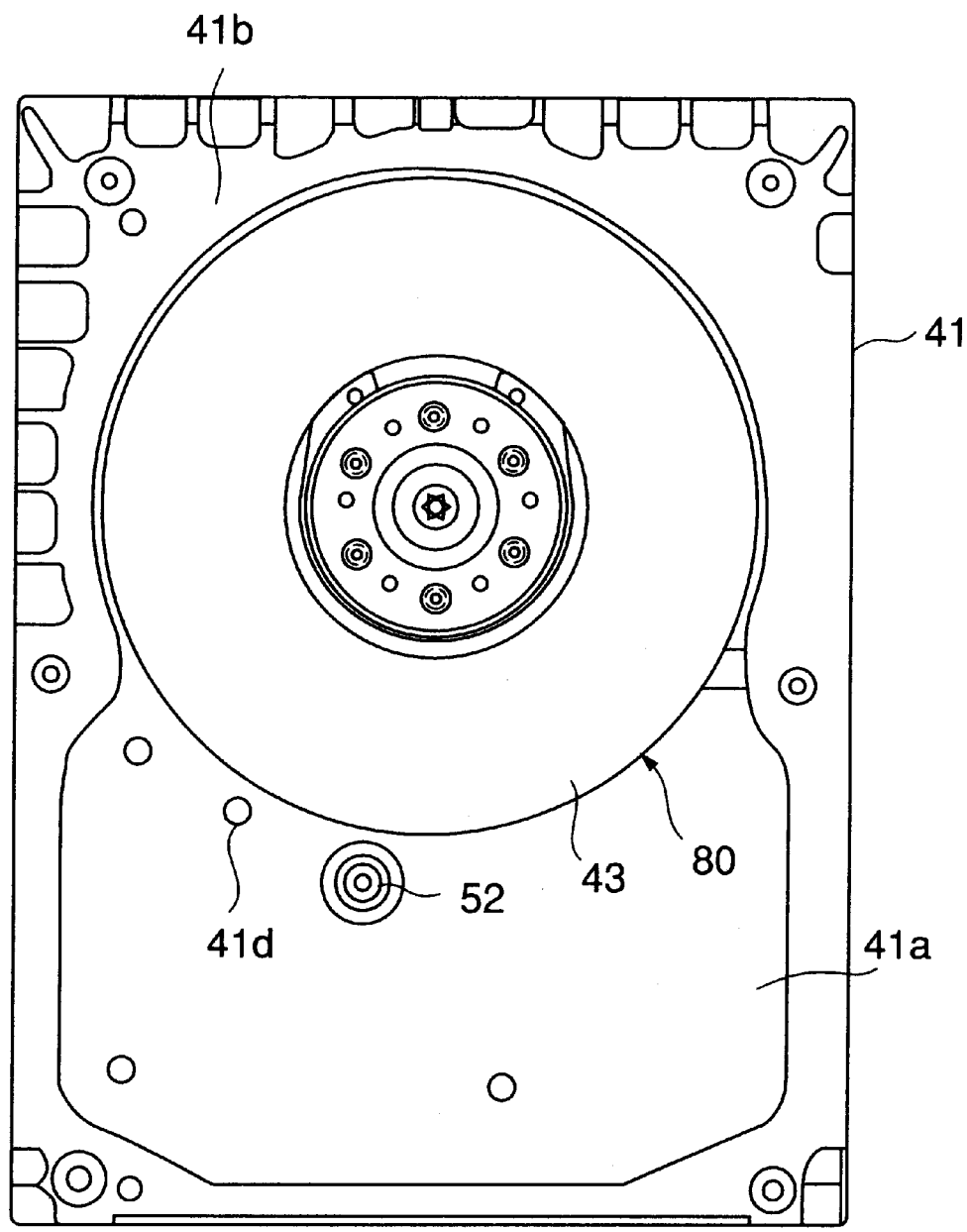
FIG. 7 is a plan view showing a state of the hard disk device after a step 110 shown in FIG. 5 is finished.

The hard disk assembly 80 on the palette 81 is picked up and conveyed by using an incorporating apparatus having an appropriate chuck, and then is incorporated in the base 41 by being brought down on the base 41 so as to be passed through by the spindle 51 of the spindle motor 50. FIG. 7 shows the hard disk assembly 80 incorporated in the base 41.

(2) Step 111 of Incorporating the Carriage/magnetic-circuit Combination 90

The carriage/magnetic-circuit combination 90 on the palette 91 is picked up by using an incorporating apparatus having an appropriate chuck, then is conveyed with the positional relationship between the carriage 45 and the magnetic circuit 46 being kept, and thereafter, is incorporated in the base 41 by being brought down at a predetermined position on the base 41 shown in FIG. 7. The carriage 45 has the center hole 45e passed through by the axle 52.

Figure 8:
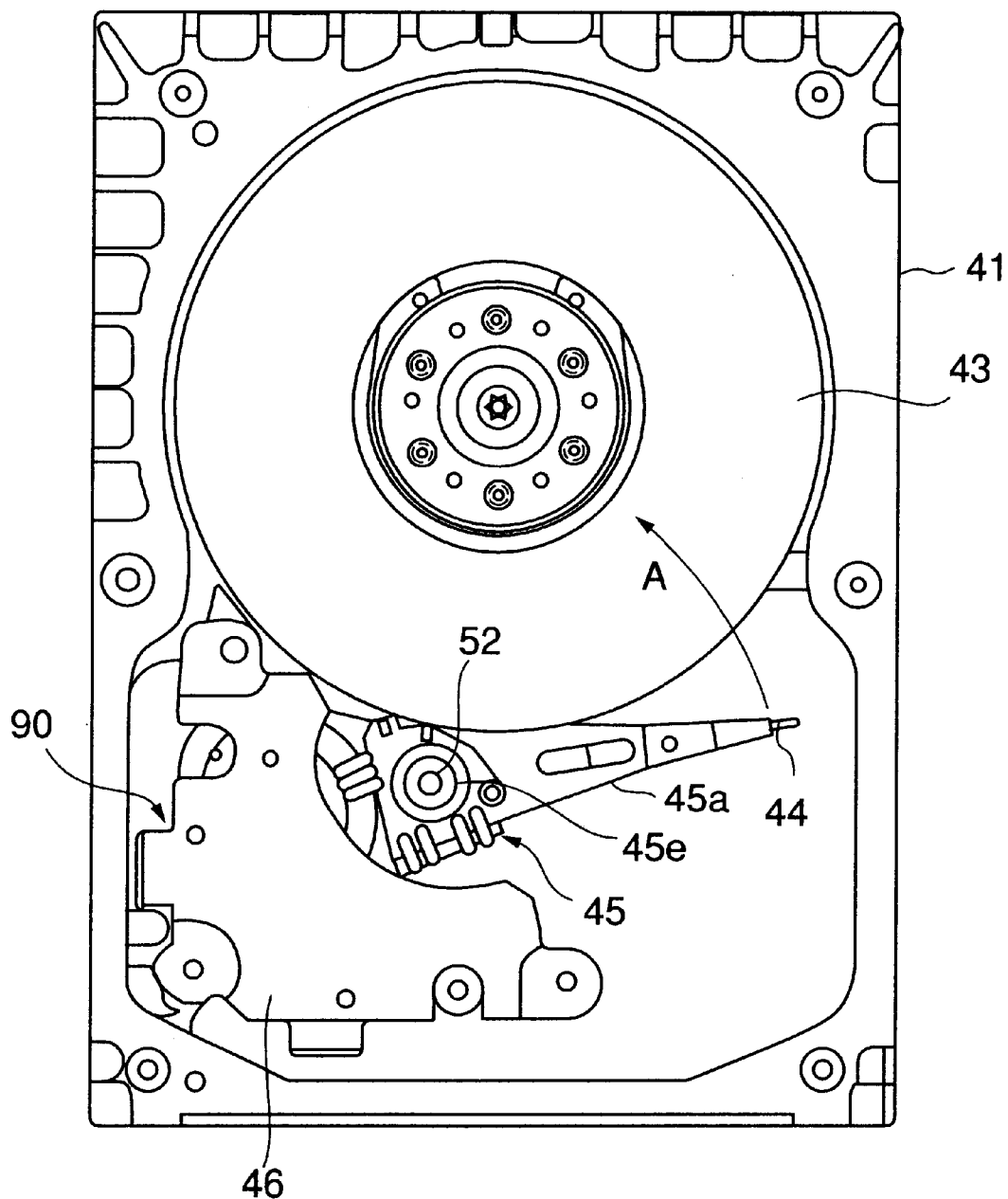
FIG. 8 is a plan view showing a state of the hard disk device after a step 111 shown in FIG. 5 is finished.

In this course, since the carriage 45 is revolved beyond the position at which the stopper 48 is to be mounted, the carriage/magnetic-circuit combination 90 can be brought down so as to be incorporated in the base 41 without a plurality of the arms 45a contacting the hard disks 43. FIG. 8 shows the carriage/magnetic-circuit combination 90 incorporated in the base 41.

(3) Step 112 of Revolving the Carriage 45 and Inserting the Arms 45a

An operator revolves the carriage 45 counterclockwise as indicated by an arrow A shown in FIG. 8 so as to insert each two of the arms 45a between the respective hard disks 43, and then brings the head slider 44 of each of the arms 45a into contact with the upper or under surface of the hard disk 43. FIG. 9 shows a state of the hard disk device 40 after this step 112 of revolving the carriage 45 and inserting the arms 45a is finished.

(4) Step 113 of Incorporating the Shroud Member 70

Figure 9:
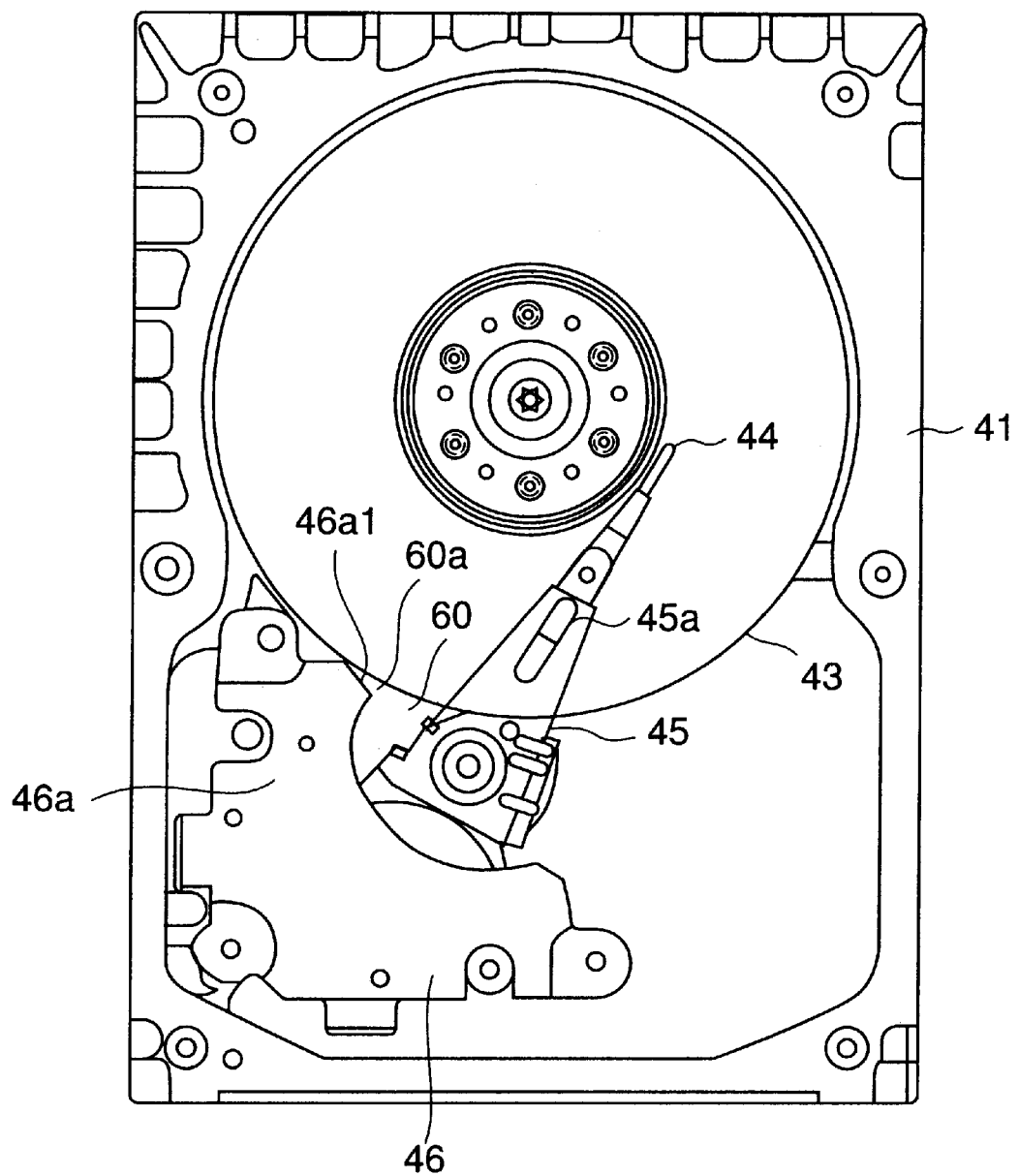
FIG. 9 is a plan view showing a state of the hard disk device after a step 112 shown in FIG. 5 is finished.

As shown in FIG. 9, revolving the carriage 45 counterclockwise creates the space 60.

An incorporating apparatus comprising a chuck unit 120 having a chuck portion 121 and a positioning pin 122 shown in FIG. 10A is used in this step. The chuck unit 120 only moves vertically and horizontally, and does not revolve. First, as shown in FIG. 10A, the chuck portion 121 is inserted into the chuck hole 73, and the positioning pin 122 is inserted into the positioning hole 74. The shroud member 70 is held by the chuck portion 121 of the chuck unit 120 at the chuck hole 73. Next, as shown in FIG. 10B, the chuck unit 120 moves so as to bring up the shroud member 70 from the palette 101, and conveys the shroud member 70 to a position right above the space 60 on the base 41. Then, as shown in FIG. 10C, the chuck unit 120 brings down the shroud member 70 onto the base board 41a of the base 41, and then the shroud member 70 is fixed on the base board 41a by the screw 75 from the undersurface thereof.

Figure 11:
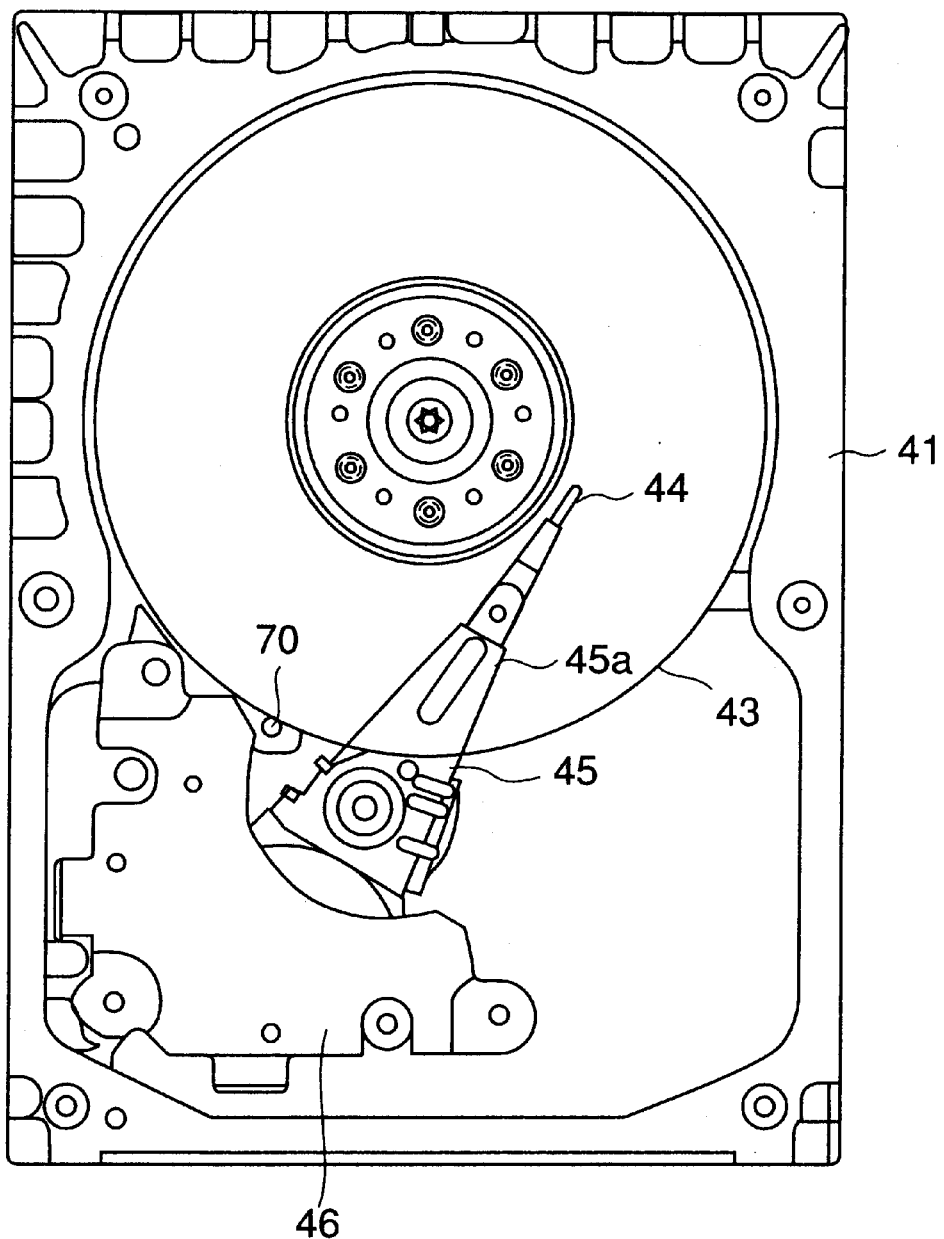
FIG. 11 is a plan view showing a state of the hard disk device after the step 113 shown in FIG. 5 is finished.

FIG. 11 shows the shroud member 70 incorporated in the base 41.

In this course, a positional relationship between the shroud member 70 on the palette 101 and the base 41 is arranged beforehand so that the shroud member 70 is positioned on the palette 101 in the same direction that the shroud member 70 is to be mounted on the base 41. Therefore, the chuck unit 120 only moves vertically and horizontally, and does not revolve. In other words, the incorporating apparatus does not have to adjust the direction of the shroud member 70. Thus, the incorporating apparatus can have a simple structure, and the shroud 70 can be incorporated in the base 41 in a short time with an excellent precision.

Besides, when it is arranged that the chuck unit clamps the outside of the shroud member 70, the shroud member 70 does not need to comprise the chuck hole 73 and the positioning hole 74. In this case, the shroud member 70 can be manufactured at a lower cost.

(5) Step 114 of Mounting the Stopper 48

Finally, the stopper 48 is mounted on the magnetic circuit 46.

Figure 12:
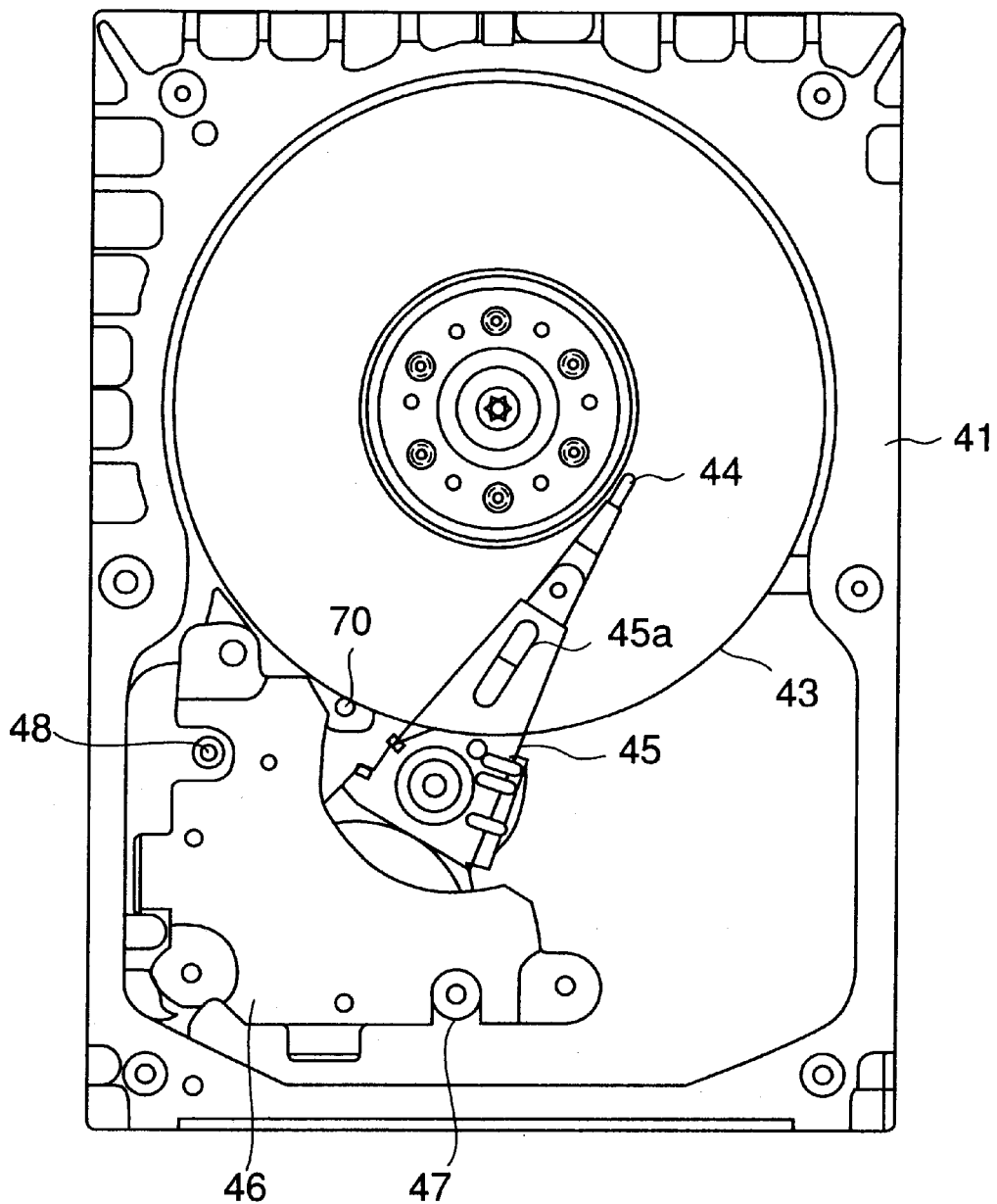
FIG. 12 is a plan view showing a state of the hard disk device after a step 114 shown in FIG. 5 is finished.

FIG. 12 shows the stopper 48 mounted on the magnetic circuit 46.

Other steps such as the step of mounting the cover are performed in the same manner as a conventional method.

Additionally, the above-mentioned structure in which the shroud member 70 is mounted afterward is also applicable to a hard disk device in which, when the hard disk 43 stops revolving, the carriage 45 is revolved clockwise so that the head slider 44 is withdrawn outside the hard disk 43, and when the hard disk 43 starts revolving, the head slider 44 is moved onto the hard disk 43.

The present invention is not limited to the specifically disclosed embodiments, and variations and modifications may be made without departing from the scope of the present invention.

The present application is based on Japanese priority application No. 2001-116023 filed on Apr. 13, 2001, the entire contents of which are hereby incorporated by reference.

What is claimed is:

1. A hard disk device:

a housing having a base;

a hard disk provided in said housing, the hard disk rotating at a high speed in at least one rotational direction;

a carriage provided in said housing, the carriage having a head slider on one end thereof;

a magnetic circuit provided in said housing, the magnetic circuit causing said carnage to revolve back and forth alternately around an axis; and a shroud member fixed on said base, the shroud member being a separate member from said base;

wherein said shroud member is positioned entirely in a space between said carriage and said magnetic circuit, the space existing at an upstream position from said axis in said rotational direction of said hard disk, so as to improve track misregistration, said shroud member improving track misregistration by having a solid shroud surface facing an outer circumferential edge of said hard disk, without overlapping said hard disk, that prevents airflow from going through said shroud member.

2. A hard disk device:

a housing having a base;

a hard disk provided in said housing, the hard disk rotating at a high speed in at least one rotational direction;

a carriage provided in said housing, the carriage having a head slider on one end thereof;

a magnetic circuit provided in said housing, the magnetic circuit causing said carriage to revolve back and forth alternately around an axis; and a shroud member fixed on said base, the shroud member being a separate member from said base;

wherein said shroud member has a female screw portion and a positioning hole at an undersurface thereof, the female screw portion having an opening at a lower end thereof, so that said shroud member is fixed on said base in a predetermined direction by being conveyed on said base while being supported on a palette at a position in said direction by having said opening and said positioning hole passed through by projections on said palette, respectively.

* * * * *